US006848706B2

(12) United States Patent
Kreuzer et al.

(10) Patent No.: US 6,848,706 B2
(45) Date of Patent: Feb. 1, 2005

(54) GAS BAG MODULE

(75) Inventors: Martin Kreuzer, Kleinwallstadt (DE); Udo Bieber, Niedernberg (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 95 days.

(21) Appl. No.: 10/123,639

(22) Filed: Apr. 16, 2002

(65) Prior Publication Data
US 2002/0153712 A1 Oct. 24, 2002

(30) Foreign Application Priority Data

Apr. 18, 2001 (DE) .......................................... 101 18 983

(51) Int. Cl.⁷ .............................................. B60R 21/16
(52) U.S. Cl. ................................... 280/728.3; 280/731
(58) Field of Search ............................ 280/728.3, 731, 280/732, 728.2

(56) References Cited

U.S. PATENT DOCUMENTS

| | | | | |
|---|---|---|---|---|
| 4,514,920 A | * | 5/1985 | Shafrir et al. | 40/448 |
| 5,505,483 A | | 4/1996 | Taguchi et al. | |
| 5,516,143 A | * | 5/1996 | Lang et al. | 280/728.3 |
| 5,683,101 A | * | 11/1997 | Davis et al. | 280/728.3 |
| 5,786,049 A | * | 7/1998 | Nusshor | 428/35.2 |
| 6,062,595 A | * | 5/2000 | Ha | 280/731 |
| 6,151,980 A | * | 11/2000 | Nishitani et al. | 74/484 R |
| 6,464,381 B2 | * | 10/2002 | Anderson et al. | 362/488 |

FOREIGN PATENT DOCUMENTS

| | | |
|---|---|---|
| DE | 4414761 A | 11/1994 |
| DE | 29821510 | 6/1999 |
| DE | 20105002 | 7/2001 |
| EP | 0554448 A | 8/1993 |
| EP | 0785107 | 7/1997 |
| GB | 2344318 A | 6/2000 |
| JP | 11115652 | 4/1999 |

OTHER PUBLICATIONS

European Search Report; Jun. 16, 2004.

* cited by examiner

Primary Examiner—David R. Dunn
(74) Attorney, Agent, or Firm—Tarolli, Sundheim, Covell & Tummino L.L.P.

(57) ABSTRACT

The invention relates to a gas bag module comprising a covering cap which is visible from the exterior in an installed state and covers an outlet opening for a gas bag. The module further comprises at least one display integrated in the covering cap and a lighting for the display provided on a rear face of the covering cap. The covering cap has a front wall visible from the exterior with a section covering the outlet opening, the section being connected in one piece with a display section lying over the lighting. In the display section, the covering is constructed so as to be transparent or translucent. The display section is made of a first material component of the covering cap and the covering cap includes a second material component which has a carrier layer in the form of a cup. The base of the cup forms the section closing the outlet opening and the peripheral wall of which laterally delimits an accommodation space for the gas bag.

10 Claims, 2 Drawing Sheets

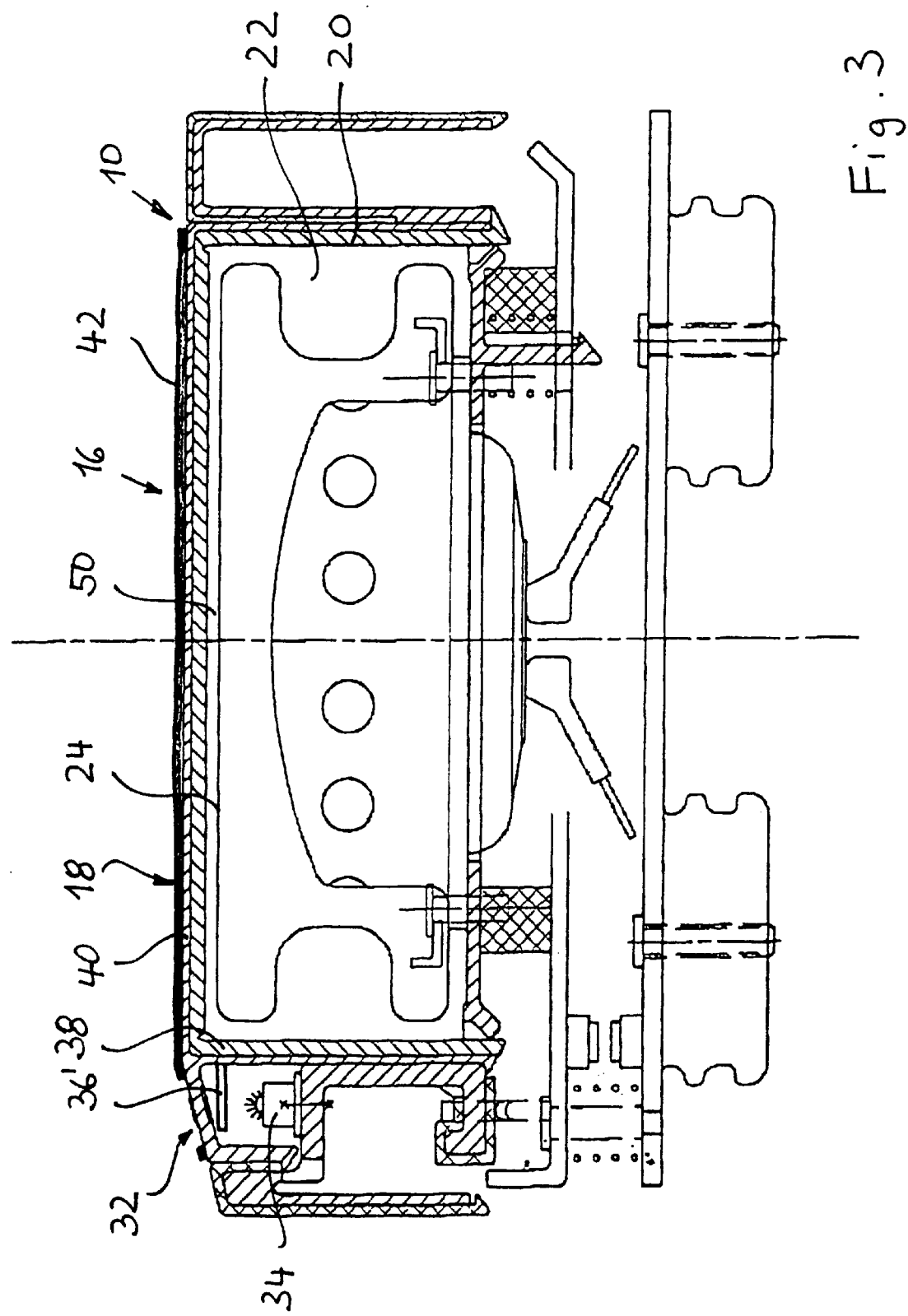

GAS BAG MODULE

TECHNICAL FIELD

The invention relates to a gas bag module for restraining a vehicle occupant. In particular, the invention relates to a gas bag module integrated in the steering wheel.

BACKGROUND OF THE INVENTION

Gas bag modules are known, which in addition contain multifunctional keys, mounted from the exterior, for actuation of the telephone, the radio and the like. Here, these keys can be designed as combined operating- and display keys. Through the integration of light-emitting diodes, the symbols are also able to be read on nighttime journeys. The addition of multifunctional keys always involves the formation of a gap between the keys and the covering cap, more precisely its front wall, which is visible from the front face in the installed state. A great effort is required to keep the installation tolerances as small and uniform as possible. In spite of these disadvantages, there is a need to house additional information displays in the vehicle, because modern vehicles are equipped with increasing operating functions, so that it is difficult, in part, to house all the displays in the cockpit. It is endeavored to provide modules with a high-quality external appearance, in which the displays are integrated without a gap occurring between the displays and the remainder of the covering cap. The production of such a gas bag module, in particular the achieving of a sufficient stability of the covering cap is, however, a problem.

BRIEF SUMMARY OF THE INVENTION

The invention provides a gas bag module which has a high-quality external appearance and into which the displays can be integrated.

This is achieved in a gas bag module which comprises a covering cap which is visible from the exterior in an installed state and covers an outlet opening for a gas bag. The module further comprises at least one display integrated in the covering cap and a lighting for the display provided on a rear face of the covering cap. The covering cap has a front wall visible from the exterior with a section covering the outlet opening, the section being integrally connected, i.e. in one piece, with a display section lying over the lighting. In the display section, the covering is constructed so as to be transparent or translucent. The display section is made of a first material component of the covering cap and the covering cap includes a second material component which has a carrier layer in the form of a cup. The base of the cup forms the section closing the outlet opening and the peripheral wall of which laterally delimits an accommodation space for the gas bag.

According to the invention, the covering cap extends as far as to over the light, i.e. it continues into the display and is constructed so as to be transparent or translucent in the region of the light. Through the construction in one piece, no gap is produced, so that a smooth visible front wall is presented to the occupant from the exterior. The display can either be arranged behind the front wall under the transparent or translucent region. Furthermore, however, the covering cap itself can also form the display, by the covering cap being transparent along lines to create a symbol, e.g. by the transparent section forming a "+" or "−". Of course, a larger display field could also lie behind the transparent region, e.g. an illuminated LCD screen, which can provide various displays. The stability of the covering cap is, however, achieved through the support layer, and this only makes possible the transparent or translucent construction of the first material component. Through the cup-shaped construction of the support layer, the regions which are mainly stressed on opening of the covering cap, are stabilized namely to the side of the gas bag and in the direction outwards.

Preferably, the first material component is connected with the second material component in the region of the base and extends laterally beyond the border of the base and forms in this region the display section.

The transparent or translucent layer forms here the border of the front wall.

In the region of the display section, the covering cap preferably has, at least in these sections forming numbers or symbols, a smaller thickness, so that a greater transparency is achieved.

The previously mentioned possibility that the covering cap itself forms a display can be constructed such that the covering cap has a transparent/translucent layer with an external, impermeable covering layer which is partially not present, namely in the region of the display.

This covering layer can, for example, be subsequently removed from the exterior, e.g. by means of a laser. Alternatively, of course, the transparent layer could be partially covered on application of the opaque covering layer.

An advantageous covering layer is a lacquer which is adapted in terms of color and its surface with the rest of the interior.

The display, e.g. the symbols, can, however, already be introduced into the injection-mold for manufacture of the covering cap and can be coated with a thin translucent layer of lacquer.

Thermoplastic polyurethane or thermoplastic polymer, which are made by the injection-molding process into the covering cap, present themselves as materials for the transparent display section.

The transparent or translucent layer can form only a section of the front wall or else can extend across the entire front wall, which can offer advantages in terms of manufacturing technique.

The preferred embodiment makes provision that the illumination is situated outside the accommodation space, preferably separated from the accommodation space directly by the peripheral wall. Thereby, on its unfolding, the gas bag is prevented from scraping on the lighting of the display, and the lighting or the gas bag are prevented from being damaged. Through the peripheral wall, a three-dimensional separation of the accommodation space from the region with the lighting is achieved. Also, it can be ruled out that the lighting might be pulled along by the unfolding gas bag. For this, the front wall only tears open up to the transition of the front wall to the peripheral wall.

BRIEF DESCRIPTION OF THE DRAWINGS

FIG. 2 shows a top view onto the front wall in the region of the display and FIG. 3 shows a cross-section through a gas bag module according to a second embodiment.

DETAILED DESCRIPTION OF THE PREFERRED EMBODIMENTS

Figure 1:
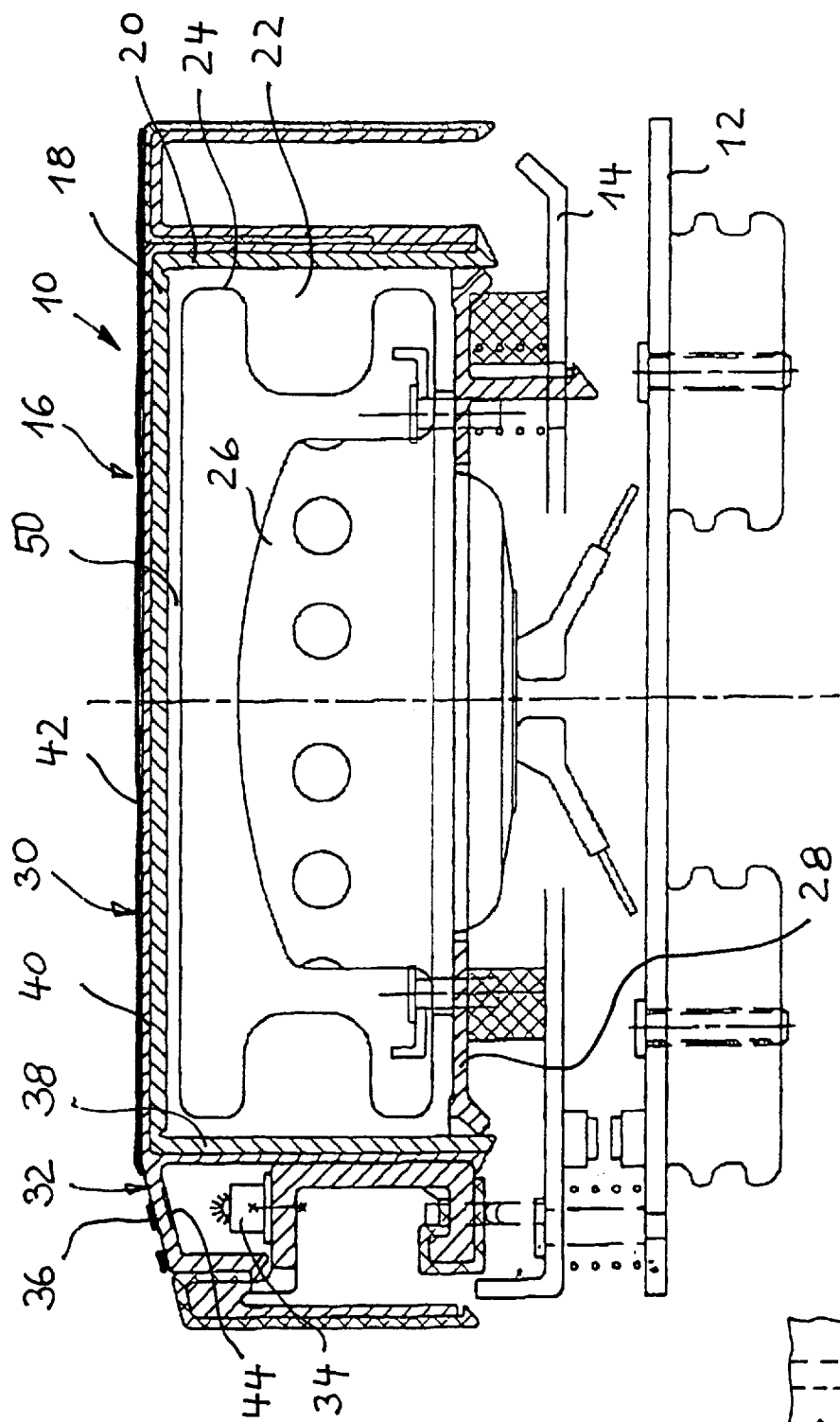
FIG. 1 shows a cross-section through an embodiment of the gas bag module according to the invention.

In FIG. 1 gas bag module 10 is illustrated which is integrated into a vehicle steering wheel. A vehicle skeleton is designated by 12, on which the gas bag module 10 is fastened by means of a so-called horn plate 14. The gas bag module comprises a cup-shaped covering cap 16 with a front wall 18, visible from the exterior in the installed state of the gas bag module 12, and with a peripheral wall 20 formed on in one piece and protruding on the rear face at right-angles to the front wall 18. The peripheral wall 20 delimits an accommodation space 22 for a gas bag 24 and a gas generator 26. The accommodation space 22 is closed on the rear face by a rear wall 28.

The front wall 18 of the covering cap 16 comprises several sections, namely a section 30 closing the accommodation space 22 on the front face, which section 30 extends as far as to the peripheral wall 20, and a display section 32 adjoining thereto laterally in one piece, which lies at the border of the covering cap 16 and covers or even forms displays which may also be operable. Beneath the display section 32, a lighting 34 is arranged to illuminate the display 36 (in FIG. 2 for example a "+" or "−" or another symbol). The lighting is preferably a LCD lamp.

In the embodiment according to FIG. 1, the display is formed by a specific construction of the covering cap 16 and is integrated therein. The covering cap 16 has a cup-shaped carrier layer 38 which lines the accommodation space 22 on the inside and forms with its base, on the inside, the section 30, and a layer 40 of transparent or translucent material, preferably thermoplastic polyurethane or thermoplastic polyester, surrounding the carrier layer 38 externally. The layer 40 is of a first material component and the carrier layer 38 is of a second material component. The layer 40 extends across the entire front wall, i.e. from section 30 into the display section 32, the layer 40 continuing in one piece in the two sections 30, 32, so that no gap or the like occurs between the display section 32 and the remainder of the front wall 18. The carrier layer 38 and the transparent or translucent layer 40 are connected with each other in the section 30. The translucent layer 40 projects laterally with respect to the carrier layer 38, with the formation of the border of the front wall 18. This embodiment permits various displays 36 to be housed in a simple manner to the side of the section 30, depending on the way the vehicle is equipped. Through the fact that the transparent or translucent layer 40 extends on the full surface across the entire front wall 18, also no fatigue failures are to be expected in the region of the front wall or tears between various material components in the visible region. Externally, a lacquer 42 is additionally sprayed onto the transparent layer 40, in order to adapt the outer surface of the front wall 18 to the remainder of the steering wheel and the design of the interior. In the region of the display section 32, lacquer 42 is removed along lines, for example by means of a laser, in order to form symbols and hence the display 36.

Alternatively, the symbols can also be introduced into the display section 32, by being printed on a foil. In this case, however, a thin, light-permeable layer of lacquer must be provided externally at least in the region of the display section 32.

In order to increase the transparency in the display section 32, the covering in the region of the display 36 has a smaller thickness than in the remaining part of the display section. A corresponding depression is designated by 44.

In the display section 32, a switch can also be integrated, by the display section for example being constructed to be so flexible that by pressing the display section in the region of the corresponding display 36, a microswitch or the like, lying under the display, is actuated.

Figure 2:
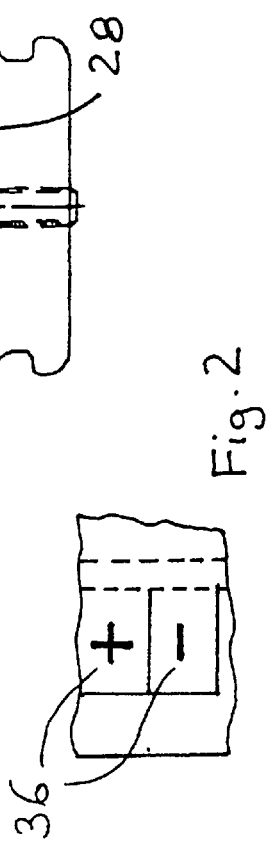

The embodiment illustrated in FIG. 2 corresponds substantially to the one illustrated in FIG. 1, with the exception that the display 36 is not integrated into the covering cap, but rather is kept transparent by means of a rectangular region. Beneath the covering cap, a display field 36' having a large area is provided, which is also made visible at night by the lighting 34. Otherwise, the embodiment illustrated in FIG. 3 corresponds to the one previously described.

On tearing open of the gas bag, the danger does not exist that the gas bag destroys the lighting 34 or the display 36, 36', because the front wall only tears open in the region of the section 30, which runs as far as to the peripheral wall 20. After swinging open, an outlet opening 50 is exposed, which was previously covered by the section 30.

The covering cap is produced by injection molding, the production of the individual layers forming successive process steps.

What is claimed is:

1. A gas bag module, comprising
a covering cap which is visible from the exterior in an installed state and covers an outlet opening for a gas bag,
at least one display integrated in said covering cap and
a lighting for said display provided on a rear face of said covering cap,
said covering cap having a front wall visible from the exterior with a section covering said outlet opening, said section being connected in one piece with a display section lying over said lighting, in which display section said covering cap is constructed so as to be one of transparent and translucent,
said display section being made of a first material component of said covering cap, and
said covering cap including a second material component which has a carrier layer in the form of a cup, a base of which forms said section closing said outlet opening and a peripheral wall of which laterally delimits an accommodation space for said gas bag,
said covering cap having one of a transparent and translucent layer with an external, non-transparent covering layer which is not present in a region of said display,
wherein said covering layer is removed from the exterior in a subsequent working step.

2. A gas bag module, comprising
a covering cap which is visible from the exterior in an installed state and covers an outlet opening for a gas bag,
at least one display integrated in said covering cap and
a lighting for said display provided on a rear face of said covering cap,
said covering cap having a front wall visible from the exterior with a section covering said outlet opening, said section being connected in one piece with a display section lying over said lighting, in which display section said covering cap is constructed so as to be one of transparent and translucent,
said display section being made of a first material component of said covering cap, and
said covering cap including a second material component which has a carrier layer in the form of a cup, a base of which forms said section closing said outlet opening and a peripheral wall of which laterally delimits an accommodation space for said gas bag, said covering cap having one of a transparent and translucent layer with an external, non-transparent covering layer which is not present in a region of said display, wherein said one of a transparent and translucent layer extends at least almost entirely across said front wall and said base of said carrier layer.

3. A gas bag module, comprising a covering cap which is visible from the exterior in an installed state and covers an outlet opening for a gas bag, at least one display integrated in said covering cap and a lighting for said display provided on a rear face of said covering cap, said covering cap having a front wall visible from the exterior with a section covering said outlet opening, said section being connected in one piece with a display section lying over said lighting, in which display section said covering cap is constructed so as to be one of transparent and translucent, said display section being made of a first material component of said covering cap, and said covering cap including a second material component which has a carrier layer in the form of a cup, a base of which forms said section closing said outlet opening and a peripheral wall of which laterally delimits an accommodation space for said gas bag, said covering cap having one of a transparent and translucent layer with an external, non-transparent covering layer which is not present in a region of said display, wherein said one of a transparent and translucent layer forms said first material component and extends laterally beyond said peripheral wall with the formation of a border of said front wall.

4. A gas bag module comprising:

a covering cap for covering an outlet opening for a gas bag of the gas bag module, the covering cap being formed in one piece from first and second material components and including a front wall and a peripheral wall that extends rearwardly from the front wall and laterally delimits an accommodation space for the gas bag, the front wall of the one piece covering cap including a section that covers the outlet opening for the gas bag and a display section, the first material component of the one piece covering cap being in the form of a cup shaped carrier layer that includes the peripheral wall and a base which forms the section of the front wall that covers the outlet opening for the gas bag, the second material component of the one piece covering cap being one of transparent and translucent, overlaying the base of the carrier layer, and forming the display section of the front wall; and a light source located behind the second material component of the covering cap for projecting light onto the display section of the front wall.

5. The gas bag module of claim 4 wherein the display section of the front wall is located radially outwardly of the peripheral wall of the carrier layer relative to the accommodation space for the gas bag.

6. The gas bag module of claim 4 wherein a thickness of the second material component in an area of the display section of the front wall is less than the thickness of the second material component in an area overlaying the base of the carrier layer.

7. The gas bag module of claim 4 wherein a display field is provided so as to lie behind the display section, the display field being visible from an exterior of the gas bag module.

8. The gas bag module of claim 4 further including a non-transparent covering layer, the non-transparent covering layer overlaying portions of an external surface of the second material component located outside of the display section of the front wall.

9. The gas bag module of claim 8 wherein the non-transparent covering layer is a lacquer.

10. The gas bag module of claim 4 wherein the light source and the display section of the front wall are located outside of the accommodation space for the gas bag.

* * * * *